United States Patent [19]

Dumar

[11] Patent Number: 4,727,673
[45] Date of Patent: Mar. 1, 1988

[54] INDICATOR LIGHT FOR AN ICE FISHING TIP-UP

[76] Inventor: Kenneth A. Dumar, 3994 Vet's Memorial Dr., Rhinelander, Wis. 54501

[21] Appl. No.: 899,067
[22] Filed: Aug. 21, 1986
[51] Int. Cl.⁴ .................................... A01K 97/12
[52] U.S. Cl. ................................ 43/17; 362/191; 362/205
[58] Field of Search ............... 362/190, 191, 205; 43/16, 17, 17.5, 19.2

[56] References Cited

U.S. PATENT DOCUMENTS

| | | | |
|---|---|---|---|
| 2,654,176 | 10/1953 | Kachelski et al. | 43/17 |
| 2,741,054 | 4/1956 | Brundage | 43/17 |
| 2,772,407 | 11/1956 | Nichols | 362/205 X |
| 2,834,140 | 5/1958 | Knier | 43/17 |
| 2,897,622 | 8/1959 | Belke | 43/17 |
| 3,024,561 | 3/1962 | Wyatt | 43/17 |
| 4,183,076 | 1/1980 | Bodde | 362/191 X |
| 4,209,930 | 7/1980 | Boynton | 43/17 |
| 4,246,716 | 1/1981 | Elmer | 43/17 |
| 4,270,297 | 6/1981 | Yates | 43/17 X |
| 4,471,554 | 9/1984 | Heiskell | 43/17 |
| 4,528,554 | 7/1985 | Klefbeck | 43/17 X |
| 4,633,608 | 1/1987 | Savarino | 43/17 |

Primary Examiner—William R. Cline
Attorney, Agent, or Firm—Lockwood, Alex, FitzGibbon & Cummings

[57] ABSTRACT

An indicator light for an ice fishing tip up includes a lighting device, a holding member for mounting the lighting device and a circuit interrupter for insertion in the circuit of the lighting device. The interrupter is attached to a movable part of the tip-up such that upon actuation of the tip-up the circuit of the lighting device is completed to cause the lighting device to illuminate for signaling purposes. The lighting device circuit interrupter and holding device are readily mountable upon and useable with a conventional form of ice fishing tip-up.

4 Claims, 6 Drawing Figures

U.S. Patent
Mar. 1, 1988
4,727,673
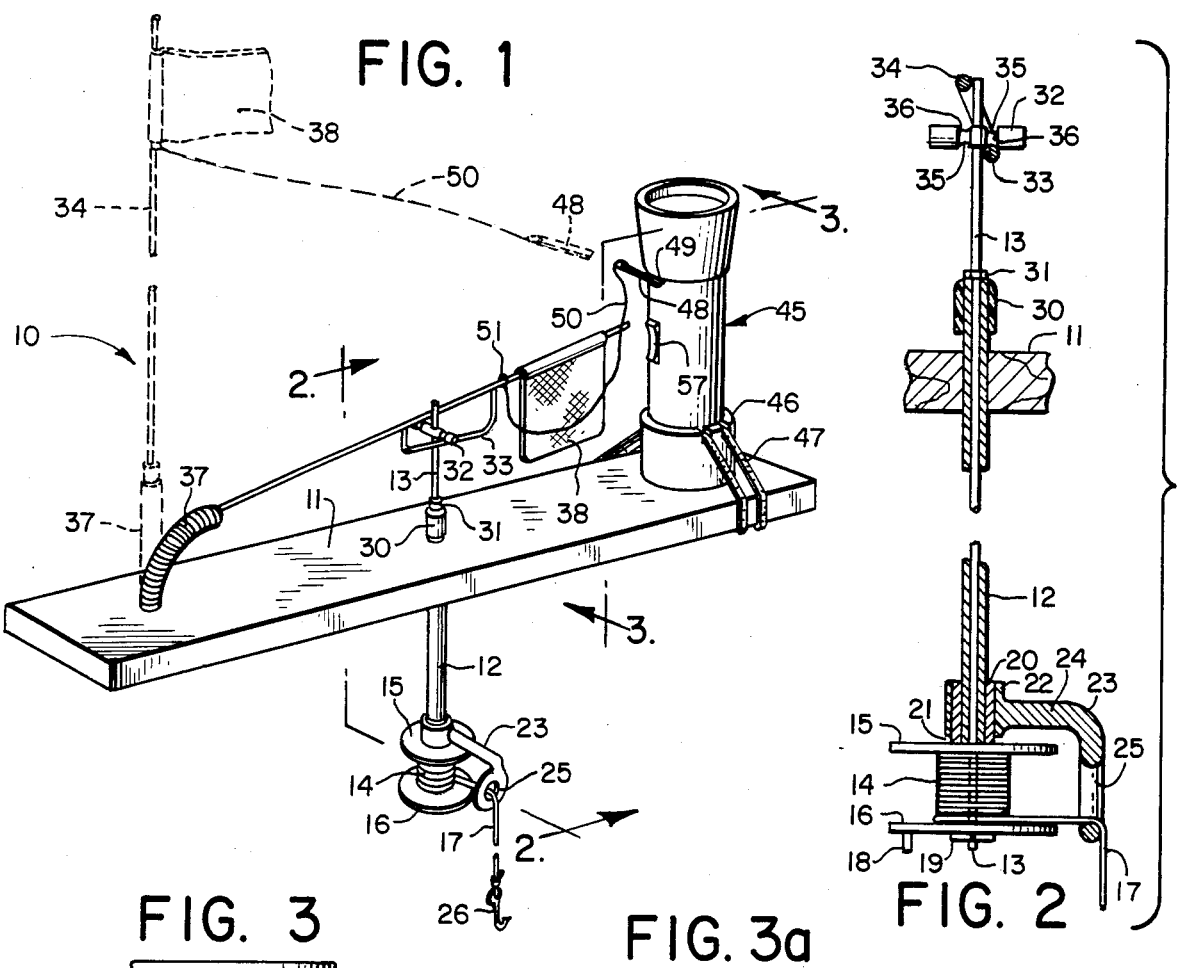
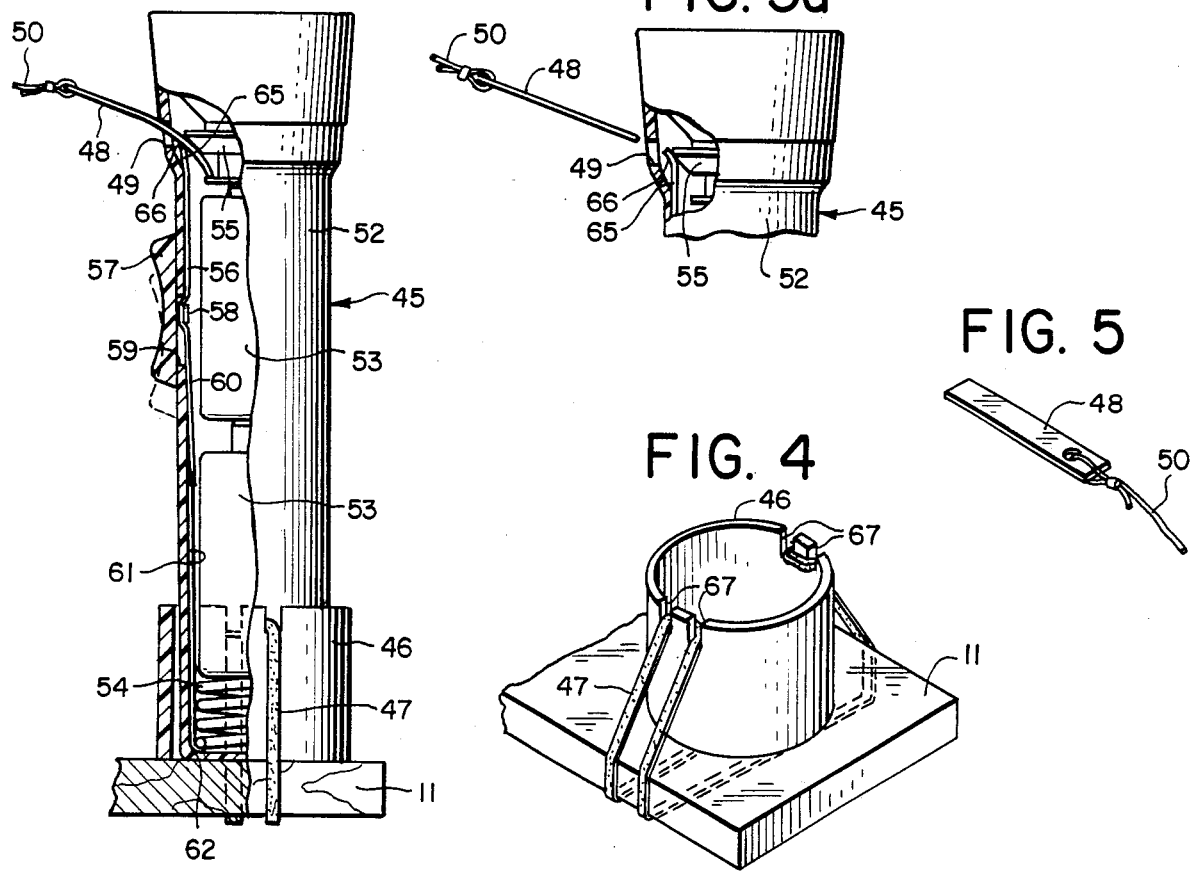

INDICATOR LIGHT FOR AN ICE FISHING TIP-UP

BACKGROUND OF THE INVENTION

The present invention relates generally to signaling systems for ice fishing devices, and in particular to the combination of a lighting device, a holder for the lighting device and an insertable circuit interrupter for the lighting device, such combination designed to be merchandised in the form of an accessory for use with a conventional ice fishing tip-up. Still further, the invention deals with an improved tip-up assembly for use in ice fishing, which assembly includes improved lighting means as well as fish strike response circuit control means for use with the lighting means.

A number of light signaling devices have been proposed and some actually used on ice fishing tip-ups for the primary purpose of enhancing the signaling of a hooked fish on the line to the user. As is conventional in ice fishing, a single user may have a plurality of fishing lines exposed in an equal number of ice holes. Frequently, ice fishing occurs at dusk or in the dark and conventional signaling devices, such as flags or the like, forming a part of the known type of tip-up are inadequate to clearly advise the user of a strike.

There have been various proposals as to the manner in which a light can be provided as part of a tip-up. The conventional tip up includes a base, typically in the form of a flat board-like member, of sufficient length to span the ice fishing hole. A fishing line with hook attached depends from a reel on the board into the hole. Other components of the tip-up are mounted on the board and operatively connected with the reel or the line so as to cause a flag to pop up in the event that a fish takes the hook and exerts sufficient pressure on the line. For night use a light in some suitable form, such as a flashlight, is operated when the visual signaling device pops up.

Known types of lighted tip-ups include a number of disadvantages. In many instances the light source is, for all practical purposes, permanently mounted on the tip-up so that it is not readily useable for other purposes. Frequently the fishing line itself is utilized to interrupt the circuit of the light source so as to prevent operation of the light until a strike occurs of sufficient force to dislodge the fishing line from the light source. Alternatively, the flexible flag staff of the tip-up may be utilized to complete the circuit of the light source when a strike occurs. In these constructions the operational components of the light circuit are exposed to adverse weather conditions. For example, the threading of the fishing line between circuit making members which are mounted externally of the light source places both the line and circuit members in a condition subject to icing and moisture. Furthermore, the clamping action of the members which are intended to make the light circuit on the line place a further resistance on the line which must be overcome by a striking fish, thereby possibly interfering with successful hooking of the fish. When the flag staff is required to resiliently engage a circuit member of the light source, the problem of exposure of this element to weather as described above exists, as well as the fact that the resilient flag staff is subject to disturbance by the wind. Tip-ups using this type of indicator light can be adversely affected by a variable wind so as to cause a dim or intermittent light signal.

In the majority, if not all, of the known illuminated tip-up designs, the light source, elements for operating the light source in response to a strike, and frequently the mounting means for the light source, are all permanent parts of the tip-up. Consequently, the utility of the tip-up is limited, as a daylight-only fisherman has no need to purchase the additional equipment necessary to illuminate the conventional tip-up. Thus, a separate packaged combination of the necessary elements described is not available, leaving the need for ready adaption of a conventional tip-up for nocturnal use unfilled.

SUMMARY OF THE INVENTION

The combination of a lighting device and holding and operational means for the lighting device, the combination to be mounted on an ice fishing tip-up with the lighting device being mounted in the holding means and being readily movable therefrom to enhance its utilization, the holding means in turn being readily mounted and dismounted on the tip-up, and the lighting device operational means being protectively engageable with the circuit means of the lighting device internally of the lighting device to interrupt the same until such time that the operation of the tip-up in response to a strike of a fish automatically removes the operational means from the lighting device to actuate the same.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

FIG. 1 is a perspective view of a known form of the ice fishing tip-up having the element of the present invention operatively mounted thereon, this Figure illustrating a portion of the operational characteristics of the tip-up in phantom.

FIG. 2 is an enlarged fragmentary sectional view of a portion of the operating mechanism of the tip-up of FIG. 1 as viewed generally along line 2—2 therein.

FIG. 3 is an enlarged partial vertical section of a portion of the tip-up having the lighting device and holding means therefor mounted thereon, as viewed along line 3—3 of FIG. 1.

FIG. 3a is an enlarged fragmentary view in partial section of the top bulb housing portion of the lighting device illustrating operational closing of the circuit of the lighting device.

FIG. 4 is a fragmentary perspective of an end portion of the tip-up and the lighting device holding means illustrating the manner in which such holding means is removably mounted on the tip-up.

FIG. 5 is an enlarged perspective of the circuit interruption means utilized with the lighting device to control operation thereof on the tip-up.

DESCRIPTION OF THE PREFERRED EMBODIMENT

FIG. 1 illustrates a well known form of ice fishing tip-up which is improved by the addition of the combination of elements of the subject invention. The basic tip-up 10 is of the type fully disclosed in U.S. Pat. No. 2,654,176, issued Oct. 6, 1953, the disclosure of which is hereby incorporated by reference. While the improvements of the present invention are illustrated in conjunction with the particular tip-up 10 illustrated, it will be understood that such improvements can be utilized with other forms of tip-ups.

The tip-up 10 includes a base 11 in the form of a wooden or metal board of sufficient length to span or bridge a drilled or chopped hole in the ice. Centrally of base 11 is a trigger-reel combination assembly which as shown in FIGS. 1 and 2 extends through base 11 with the trigger mechanism located above the base and the reel and associated parts located well below the base. This assembly includes a trigger shaft bearing tube 12 extending vertically through the base and housing a rotatable trigger shaft 13. The lower end of shaft 13 has a reel 14 mounted thereon, the reel including vertically spaced flanges 15 and 16, a fishing line 17 suitably stored on reel 14 in the conventional manner, and a hand crank 18 designed for rewinding the line 17 on reel 14 following use thereof. A suitable form of locking collar or washer 19 is mounted on the bottom end of trigger shaft 13 to contain reel 14 and related parts thereon and to lock reel 14 to trigger shaft 13 for simultaneous rotation.

Above reel 14 a bushing 20 is mounted about the trigger shaft bearing tube 12 and is suitably fixed to the tube 12. The lower end of bushing 20 is provided with a radially outwardly projecting and annularly continuous shoulder 21 which is stationary with trigger shaft bearing tube 12. The reel 14 and associated parts, including flange 15, are rotatable relative to shoulder 21 of bushing 20 as well as bearing tube 12. Received about bushing 20 is a rotatable collar 22 forming a part of a line guide 23 which includes an arm portion 24 extending radially outwardly from collar 22 and downwardly to form an eye 25 through which line 17 is threaded. Collar 22 along its bottom edge rests on shoulder 21 of bushing 20 and is rotatable relative to bushing 20, thereby permitting line guide 23 to rotate freely independently of bearing tube 12 and reel 14. When a strike occurs as a result of a fish taking the hook 26 (FIG. 1), initial tension on line 17 results in rotation of arm 23 into the direction of the strike so that line 17 is paid off radially from reel 14. As pressure from the strike is continued, reel 14 rotates to supply additional line 17 and causes trigger shaft 13 to rotate to operate the tip-up.

Above base 11 the trigger shaft bearing tube terminates with a seal cap 30 and another suitable form of locking collar 31. Collar 31 engages trigger shaft 13 to hold the same vertically against shaft bearing tube 12 thereby keeping reel 14 in engagement with bushing shoulder 21 and in alignment with arm 23. Upward extension of trigger shaft 13 places a trigger 32 suitably fixed thereto inwardly of the uppermost end thereof in alignment with an offset bar 33 of a flag staff 34 of the tip-up. Trigger 32 is provided with oppositely extending shoulders having grooves in the form of detents 35 adjacent trigger shaft 13 to receive and hold the offset bar 33 of flag staff 34. As trigger 32 is fixed to trigger shaft 13, it rotates with the shaft. The provision of a pair of shoulder,s facilitates resetting of the tip-up following use thereof. Additionally, grooves 35, in addition to providing detent areas to receive offset bar 33, present camming surfaces 36 to bar 33 to facilitate release thereof when a strike occurs.

As shown in FIG. 1, flag staff 34 forms a part of a bias coil spring 37 suitably fixed at its base to board 11 and readily bendable to permit generally horizontal positioning of flag staff 34 for engagement with trigger 32. The free end of flag staff 34 includes a flag 38. When the flag staff is released by the trigger in the manner to be described, spring 37 will cause the staff and flag 38 to move to an upright position as shown in phantom in FIG. 1, flag 38 then becoming a visual signal to the user that a strike has occurred.

To bring the foregoing about, a striking fish causes reel 14 to rotate as previously described, thereby causing rotation of trigger shaft 13 and rotation of trigger 32 fixed to shaft 13. This results in release of the offset bar 33 and flag staff 34, which moves into the upright position shown in FIG. 1. The particular form of trigger 32, and the combination of the trigger with the upwardly projecting end of trigger shaft 13, provides stability with respect to the temporary holding of flag staff 34 through use of offset bar 33. As is well known in connection with this type of tip-up, the top of shaft 13 engages a portion of flag staff 34 while offset bar 33 is held in detent 35 of trigger 32, providing a double engagement which provides for more efficient operation and release of flag staff 34. As previously described, hand crank 18 is utilized to retrieve the line and hook and rewind the line on reel 14 before trigger 32 is reset to hold flag 34 in its retracted position.

The effective utilization of the above described type of tip-up is greatly enhanced by the provision of the combination of independently mountable and useable lighting device, lighting device holder and lighting device circuit interrupter of the present invention. FIG. 1 best illustrates the general use of this combination on the conventional tip-up. A lighting device or light source in the form of a conventional flashlight 45 is vertically mounted in a holder 46 which is removably mounted on base 11 by an elastic band 47. A light source circuit interrupter 48 in the form of a strip of a non-conductive plastic is operationally received through an aperture 49 in the light source and compressively engaged between opposing circuit making contacts to maintain the circuit of the light source in open condition. The interrupter 48 at its outermost end is attached to a string or other suitable retainer 50 which, in turn, at its opposite end is suitably attached to flag staff 34 at 51 (FIG. 1).

Briefly, when a strike actuates tip-up 10 in the manner previously described and flag staff 34 moves abruptly to its upright position, as shown in phantom in FIG. 1, string 50 pulls interrupter 48 from its held engagement between the contacts of light source 45 and the light source is immediately actuated. Thus, at dusk or nighttime an additional visual light is utilized to advise the user that a strike has occurred.

As best shown in FIG. 3, light source 45 may be in the form of a conventional flashlight having an elongated case 52 which is of extended cylindrical configuration. Within the housing a pair of conventional dry cell batteries 53 are forced by a coil spring 54 into circuit making engagement with bulb socket 55 which is positioned in the upper portion of case 52 in an enlarged area so that the light emitted from source 45 projects vertically upwardly in the mounted position of source 45 on tip-up 10. Within case 52 along an inner surface thereof there is provided a sliding movable circuit contact 56 which intermediate the ends thereof is attached to a switch member or knob 57 which slides along the outer surface of case 52 in the conventional manner, the movable contact 56 being attached to the knob at 58 through a slot-like aperture 59 in case 52.

Movable contact 56 is provided with a depending spring portion 60 which at its lowermost end slidingly rides over the upper end portion of a fixed contact 61 which is suitably mounted on the inner surface of case 52 in longitudinal alignment with movable contact 56. The bottom end of fixed contact 61 is formed into an inwardly projecting foot portion 62 which is in circuit making contact with coil spring 54 when the same is compressed within case 52 by batteries 53. Thus, when the circuit is open the switch member 57 is in its down position, as shown in phantom in FIG. 3, with movable contact 56 in its down position (not illustrated), the depending spring portion 60 slidingly overlying fixed contact 61.

As viewed in FIGS. 3 and 3a, the upper end 65 of movable contact 56 is provided with a radially outwardly directed foot portion 66 which in the position illustrated in FIG. 3a is in engagement with bulb socket 55 to complete the circuit of light source 45. FIG. 3 illustrates the manner in which the circuit closing function of foot 66 and bulb 55 is temporarily interrupted by use of plastic strip 48. The strip, as best illustrated in FIG. 5 is in elongated form, and is flexible as illustrated in FIG. 3. This interrupter may be formed from any suitable non-conducting material as long as it is capable of maintaining its flexibility throughout a wide range of temperatures extending as low as −40 Fahrenheit. The interrupter strip 48 is inserted through aperture 49 of case 52 into close proximity or engagement with the adjacent surface of bulb socket 55, and sliding switch 57 is moved from the circuit open position shown in phantom lines in FIG. 3 to the circuit closing position whereby foot 66 of sliding contact 56 is placed into engagement with interrupter 48, the latter preventing closing of the circuit of the light source.

As previously described, actuation of trigger 32 to release flag staff 34 results in abrupt removal of interrupter 48 from the interior of case 52 of light source 45. This removal as illustrated in FIG. 3a results in resilient engagement of foot 66 of movable contact 56 with bulb socket 55 to complete the circuit of the light source. This particular mode of operation in the use of a light source in combination with a conventional form of tip-up provides a number of advantages not present in previously known forms of lighted tip-ups. The plastic interrupter strip 48 is not subject to changing or adverse weather conditions since the operative portion of the strip is received within the light source. The strip is of sufficient width to provide a substantial surface engagement with the opposed contact portions of the light source thereby maintaining the same in good functioning relationship by reason of a wiping action which occurs during withdrawal of the strip from between the contact portions. This is of particular importance when the tip-up described is used under adverse weather conditions, particularly those susceptible to the formation of ice. Of particular importance, the force necessary to withdraw the interrupter strip 48 from within casing 52 is not directly dependent on the force of the strike of the fish transmitted by line 17. In particular, the basic tip-up continues to operate in its conventional manner independently of the existence of the added light source and associated parts. In the form of tip-up illustrated, the force of the strike is transmitted directly to trigger 32 and need merely be sufficient to rotate the trigger and release flag staff 34 without requiring an additional increment of strike force to withdraw interrupter strip 48 from light source 45. The strength of coil spring 37, which forms a part of the tip-up and functions completely independently of the force of a strike is relied upon to remove interrupter strip 48 from the light source while the spring is raising staff 34 to its upright signal position. It is important that the force of the strike does not directly determine the operation of the light source. As is well known, fish are sensitive to any unnatural resistance when taking bait prior to being hooked. During winter months the cold water causes lowering of the metabolism of fish and they require little food. In their non-aggressive state fish are extremely cautious and will not strike something which does not appear to be or does not feel natural.

FIG. 4 best illustrates the details of light source holder 46. This holder is in the form of a sleeve which may be cylindrical as shown, or may be of any suitable configuration to conform to the outer configuration of case 52 of light source 45. Holder 46 is of sufficient vertical extent to receive the bottom portion of case 52 of light source 45 therein and hold the same in a stable vertical position. Preferably, the fit between the light source case and the holder will be such as to permit ready insertion and removal of the light source while eliminating any relative wobbling.

The holder 46 at least at the upper end thereof is provided with a pair of spaced slots 67 arranged in opposite relationship to receive the resilient tie-down 47, which may be in the form of a simple rubber band. Opposite end portions of band 47 are received in the grooves in overlapping relation with the upstanding shoulders between grooves 67 and extend under base 11 of the tip-up to resiliently position holder 46 in a vertical upright position. In this manner holder 46 may be readily attached and removed from the base of any suitable form of tip-up, the holder being available along with the light source and interrupter strip 48 in the form of a separately packaged combination for use with various forms of tip-ups. As previously described, the improvements of the present invention are not permanent parts of a tip-up, thereby permitting such improvements to be used with various forms of tip-ups, and also permitting individual tip-ups to be used without such improvements in the event that nighttime fishing is not contemplated at a given moment.

Removability of light source 45 from holder 46 is of significance. Once a strike has occurred, the light source may be readily removed from the holder and used during reeling in of the catch and removal of the hook from the catch. The same source can be used for baiting the hook and rewinding the line on the reel as well as resetting of the tip-up. Obviously, the light source may be used for other purposes as well. The use of a full-size flashlight produces a bright light always important in ice fishing particularly on dark ice at night. Following removal of interrupter strip 48 from housing 52 of light source 45, the flashlight may be subjected to normal switching using external switch 57 in the usual manner.

Once the catch has been removed and the tip-up and its various parts reset, plastic strip 48 may be readily reinserted in aperture 49 of light source 45 with the lighting switch 57 in the off position. The switch 57 is then moved forwardly so that the contact foot 66 will engage the plastic strip 48 and resiliently hold the same against the adjacent surface of bulb socket 55. This resetting of the light source system can be easily accomplished even in the dark.

While a particular embodiment of the invention has been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

I claim:

1. In combination, light means and holding and operational means therefor for use with an ice fishing tip-up; said combiantion comprising:

a lighting device holder in the form of a sleeve adapted to receive a base portion of a lighting device therein and hold the same in a coaxial projecting position relative to said holder and in a radially directed relation relative to a tip-up on which said holder is designed to be mounted whereby to permit ready removal of a lighting device from said holder, said holder including an end portion provided with releasable connection means for releasable attachment of said holder to a tip-up;

a lighting device for removable mounting in said holder, said lighting device including a casing having internal circuit completion means including a movable switching portion which opens and closes a circuit, external operating means in engagement with said movable switching portion for independent operational use of said lighting device, and an aperture aligned with an operable end of said movable switching portion for external access to said movabloe switching portion; and circuit completion interruption means for insertion through said aperture into removable engagement with said movable switching portion to interrupt said circuit and prevent said lighting device from being operable, said interruption means being attached to withdrawal means for connection with an operational portion of a tip-up to withdraw said interruption means form said lighting device upon operation of a tip-up thereby permitting completion of the operational circuit of said lighting device.

2. The combination of claim 1 wherein said releasable connection means are in the form of oppositely positioned pairs of slots receiving elastic means therein for releasable attachment of said holder to a tip-up.

3. The combination of claim 2 wherein said casing contains power source means in the base portion thereof and a bulb mounting housing at one end thereof, said movable switching portion being movable into circuit closing engagement with said bulb mounting housing, the area of said circuit closing engangement being in alignment with said aperture, said circuit completion interruption means being in the form of a flat elongated insulation strip having attached at one end thereof said withdrawal means, the oppposite end of said strip being insertable through said aperture into interrupting engagement between said bulb mounting housing and said movable switching portion.

4. A lighted tip-up for use in ice fishing, said tip-up comprising:

a base;

fishing line supply means depending from said base for insertion in a hole in an ice surface;

trigger means on said base and operatively engageable with said fishing line supply means to be operated in response to a strike on said line;

movable signal means on said base having operative and inoperative positions engageable with said trigger means to hold said signal means in its inoperative position in the absence of a strike on said line, said signal means being in the form of a flag and staff spring mounted to said base and movable from a trigger held horizontal position to an operative upright position;

a lighting device on said base to direct light upwardly therefrom when operational, said lighting device including an elongated casing containing power source means and a bulb mounting housing at one end thereof, switch means extending along an inner surface of said casing and including a movable portion for engagement with said bulb mounting housing to close the operational circuit of said lighting device, and an aperture in said casing adjacent the area of circuit closing engagement of said movable portion and said bulb mounting mounting;

lighting device cirucit interruption means being insertable through said aperture and into separating engagement with said movable portion and said bulb mounting housing to interrupt the operation of said lighting device in the absence of a strike on said line, said circuit interruption means including attachment means for connecting said circuit interruption means to said staff whereby said circuit interruption means is removed from said lighting device when said signal means is released by said trigger means and moved to its operative position; and holding means removably mounted on said base and being in the form of a sleeve releasasbly receiving the base of the casing of said lighting device to permit removal thereof from said base for independent operation of said lighting device, opposite areas of an end portion of said sleeve including slots receiving elastic means removably attaching said holding means to said base.

* * * * *